United States Patent
Park

(10) Patent No.: US 6,631,824 B2
(45) Date of Patent: Oct. 14, 2003

(54) APPARATUS FOR CONTROLLING PRESSURE OF AN AIR POCKET OF DOUBLE-LAYERED COOKING VESSEL

(76) Inventor: Jong-Do Peter Park, 1630 Summit Ridge Dr., Diamond Bar, CA (US) 91765-4335

(*) Notice: Subject to any disclaimer, the term of this patent is extended or adjusted under 35 U.S.C. 154(b) by 0 days.

(21) Appl. No.: 10/142,099

(22) Filed: May 9, 2002

(65) Prior Publication Data

US 2003/0102320 A1 Jun. 5, 2003

(51) Int. Cl.⁷ ............... B65D 25/00; A47J 27/18
(52) U.S. Cl. ........ 220/740; 99/403; 220/573.1; 220/592.28; 220/756; 251/320
(58) Field of Search ............... 220/573.1, 756, 220/573.2, 573.3, 573.4, 573.5, 203.13, 203.17, 203.27, 740, 592.28; 251/320, 333; 99/342, 403; 219/430, 439

(56) References Cited

U.S. PATENT DOCUMENTS

| | | | | |
|---|---|---|---|---|
| 2,524,558 A | * | 10/1950 | Burkhardt | 220/315 |
| 2,817,744 A | * | 12/1957 | Free | 219/439 |
| 4,667,085 A | * | 5/1987 | Remmel et al. | 219/439 |
| 4,796,776 A | * | 1/1989 | Dalquist et al. | 220/203.05 |
| 5,228,384 A | * | 7/1993 | Kolosowski | 99/342 |
| 5,507,220 A | * | 4/1996 | Jung | 99/403 |
| 6,320,166 B1 | * | 11/2001 | Park | 219/439 |

* cited by examiner

Primary Examiner—Lee Young
Assistant Examiner—Joseph C. Merek

(57) ABSTRACT

The present invention is an apparatus for controlling pressure of an air pocket of a double-layered cooking vessel, which prevents the distortion or explosion of the double-layered cooking vessel that may result from high pressures generated within the air pocket by the heating of liquid and moisture trapped within the air pocket. In a double-layered cooking vessel having an air pocket between inner and outer shells, the present invention includes an exhaust port located on the outer shell, a handle covering the exhaust port, and exhaust means located within the handle to allow the discharge of vapor steam from the air pocket and through an exhaust port. The exhaust means for controlling pressure inside the air pocket is performed by opening and closing the exhaust port. The exhaust means includes a housing attached to the outer shell, a compressible valve installed at the housing so as to open/close the exhaust hole, a fixing part attached to an inner wall of the housing so as to support the valve, a coupling part fixing the handle and fixing part to the housing, and an outlet formed within the handle to act as a conduit to discharge the steam into the outside environment.

13 Claims, 4 Drawing Sheets

APPARATUS FOR CONTROLLING PRESSURE OF AN AIR POCKET OF DOUBLE-LAYERED COOKING VESSEL

CROSS REFERENCE TO RELATED ART

This application claims the benefit of Korean Patent Application No. 2001-75395, filed on Nov. 30, 2001, which is hereby incorporated by reference in its entirety.

BACKGROUND OF THE INVENTION

1. Field of the Invention

The present invention relates to generally to an apparatus for controlling pressure, and more particularly, an apparatus for controlling pressure of an air pocket of a double-layered cooking vessel.

2. Description of the Related Art

Heat should be distributed uniformly throughout a cooking vessel to be heated in order to effectively and efficiently cook food. Double-layered cooking vessels have been designed and manufactured to take advantage of the insulating properties of air, which allow for more efficient heat convection when cooking. As a result, food within the vessel is more evenly cooked, as opposed to just on the bottom as in the cases of most cooking vessels. FIG. 1 shows an example of a conventional double-layered cooking vessel that utilizes a layer of air for insulation.

The bottom structure of a double-layered cooking vessel, as shown in FIG. 1, includes a first heat-conduction plate 13, which is made of aluminum. The first heat-conduction plate 13 is situated between and in contact with inner and outer shells 12 and 14, respectively, which are both made of stainless steel. A second heat-conduction plate 15, which is made of aluminum, is situated between and in contact with a stainless steel reinforcement plate 16 and the outer shell 14.

The lateral structure of the double-layered cooking vessel is constructed in a manner such that a uniform interval is provided between the inner and outer shells 12 and 14, respectively, wherein an air pocket 20 is situated. The top edges of the inner and outer shells 12 and 14 are secured together by a roll-joint 18 so as to provide a water tight seal, which prevents liquid from entering the air pocket 20. Handles 30 are provided near the top edge of the outer shell 14 to assist in transporting the double-layered cooking vessel.

Often times, the roll joint 18 may become compromised so that there is no longer a valid seal and liquid may enter the air pocket 20. Situations such as when the double-layered cooking vessel is washed with water create the potential of liquid and/or moisture entering the air pocket 20. When the pan is subsequently heated, the liquid that may be trapped within the air pocket 20 is vaporized, thus creating steam pressure within the air pocket 20. Repeated pressurization and depressurization as a result of heating and cooling as well as eventual corrosion of the shells due to the presence of liquid and moisture via oxygenation may deform the overall shape of the air pocket and the double-layered cooking vessel itself. Consequently, the structural integrity of the double-layered cooking vessel is compromised and may result in the dangerous situation of the air pocket 20 exploding, injuring both persons and property. To resolve this issue, prior art has shown the installation of a pressure control valve on the outer shell 14 in order to relieve any steam pressure generated while heating the double-layered cooking vessel. However, such devices ultimately complicate the design and manufacture of such pans, thereby increasing their overall cost.

SUMMARY OF THE INVENTION

Accordingly, the present invention is directed to an apparatus for controlling pressure of an air pocket of a double-layered cooking vessel that substantially obviates one or more problems due to limitations and disadvantages of the related art.

An object of the present invention is to provide an apparatus for controlling the pressure of an air pocket of a double-layered cooking vessel automatically Another object of the present invention is to provide an apparatus for controlling the pressure of an air pocket of a double-layered cooking vessel automatically that is installed within the inner space of a handle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a double-layered cooking vessel having an air pocket between inner and outer shells, an apparatus for controlling a pressure inside the air pocket of the double-layered cooking vessel according to the present invention includes an exhaust port on the outer shell providing an outlet for the air pocket, a handle mounted over the exhaust port on the exterior of the outer shell, and an exhaust means located within the handle.

According to one aspect of the preferred embodiment, the exhaust means includes a housing attached to the outer shell and having a space opened externally and a valve installed at the housing so as to open/close the exhaust hole elastically.

According to another aspect of the preferred embodiment, the valve includes a head formed of an elastic material and having a conical figure so as to open/close the exhaust hole wherein a central part of the head is recessed and a support frame extending from the head and having a circumference of which cross-section is step-like.

According to another aspect of the preferred embodiment, the exhaust means further include a fixing part attached to an inner wall of the housing so as to support the valve, a coupling part fixing the handle and a fixing part to the housing after the handle is coupled with the housing, and an outlet formed at the handle by perforation so as to exhaust the gas in the space externally.

Therefore, the present invention is characterized in that the distortion or explosion of the double-layered cooking vessel due to the high pressure of the air pocket is prevented by making the steam of high pressure inside the air pocket push an elastic valve to escape through an exhaust hole.

Moreover, the present invention is characterized in that a complicated structure is prevented by installing the pressure controller of the air pocket at the inner space of the handle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and, together with the description, serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
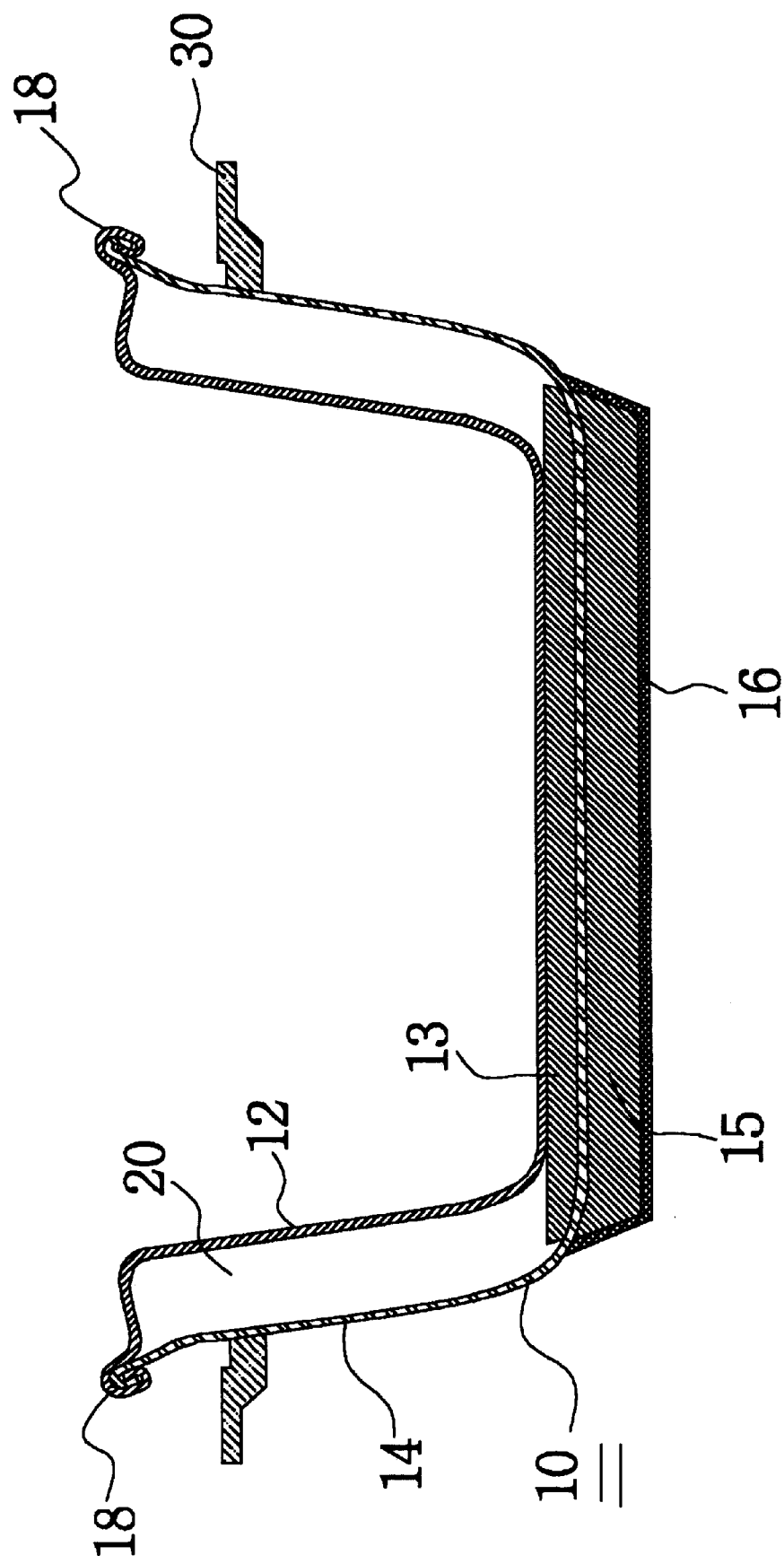
FIG. 1 illustrates a cross-sectional view of a double-layered cooking vessel according to conventional art.
Figure 2:
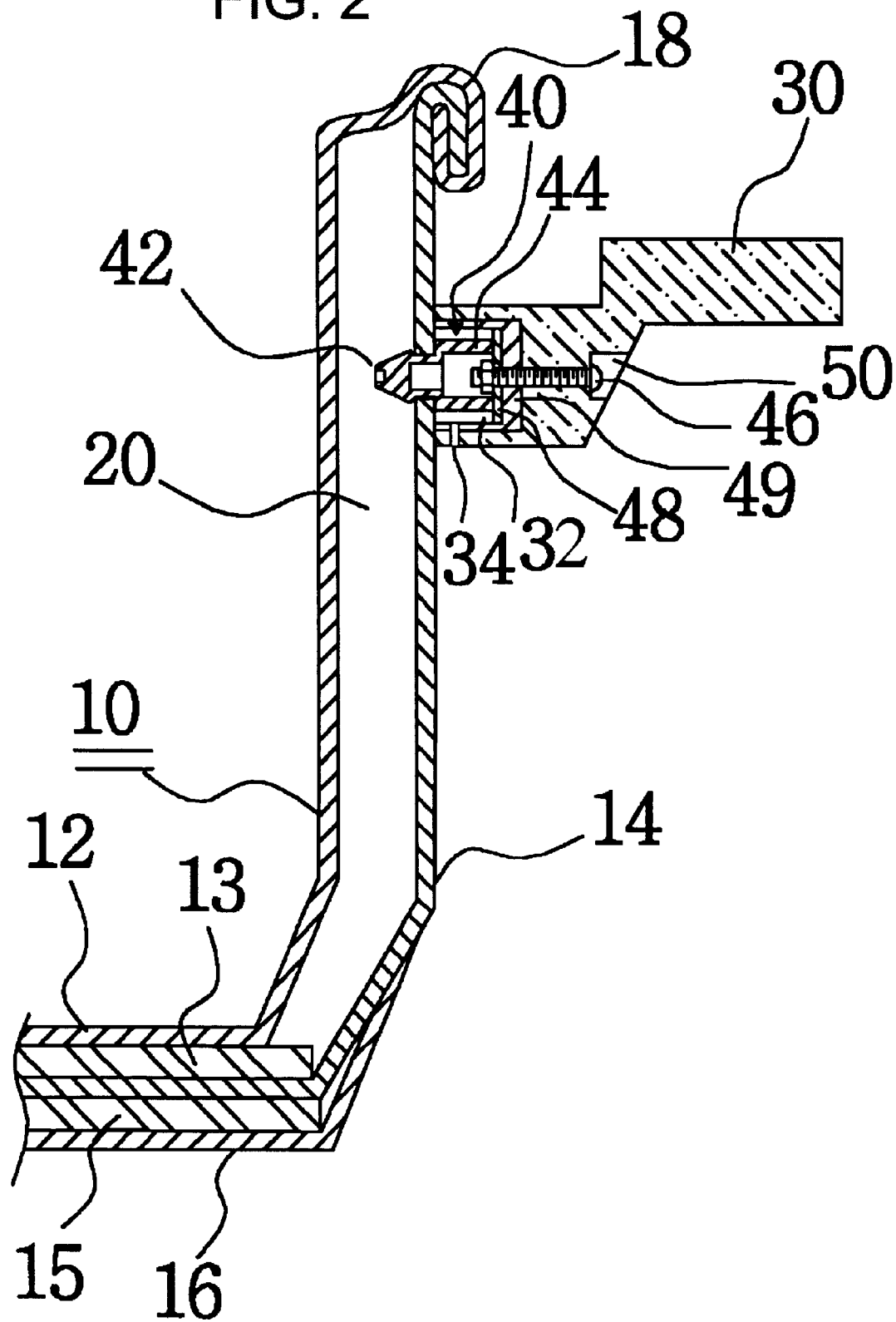
FIG. 2 illustrates a cross-sectional view of a double-layered cooking vessel according to a preferred embodiment of the present invention, in which a valve located within a handle is closed
Figure 3:
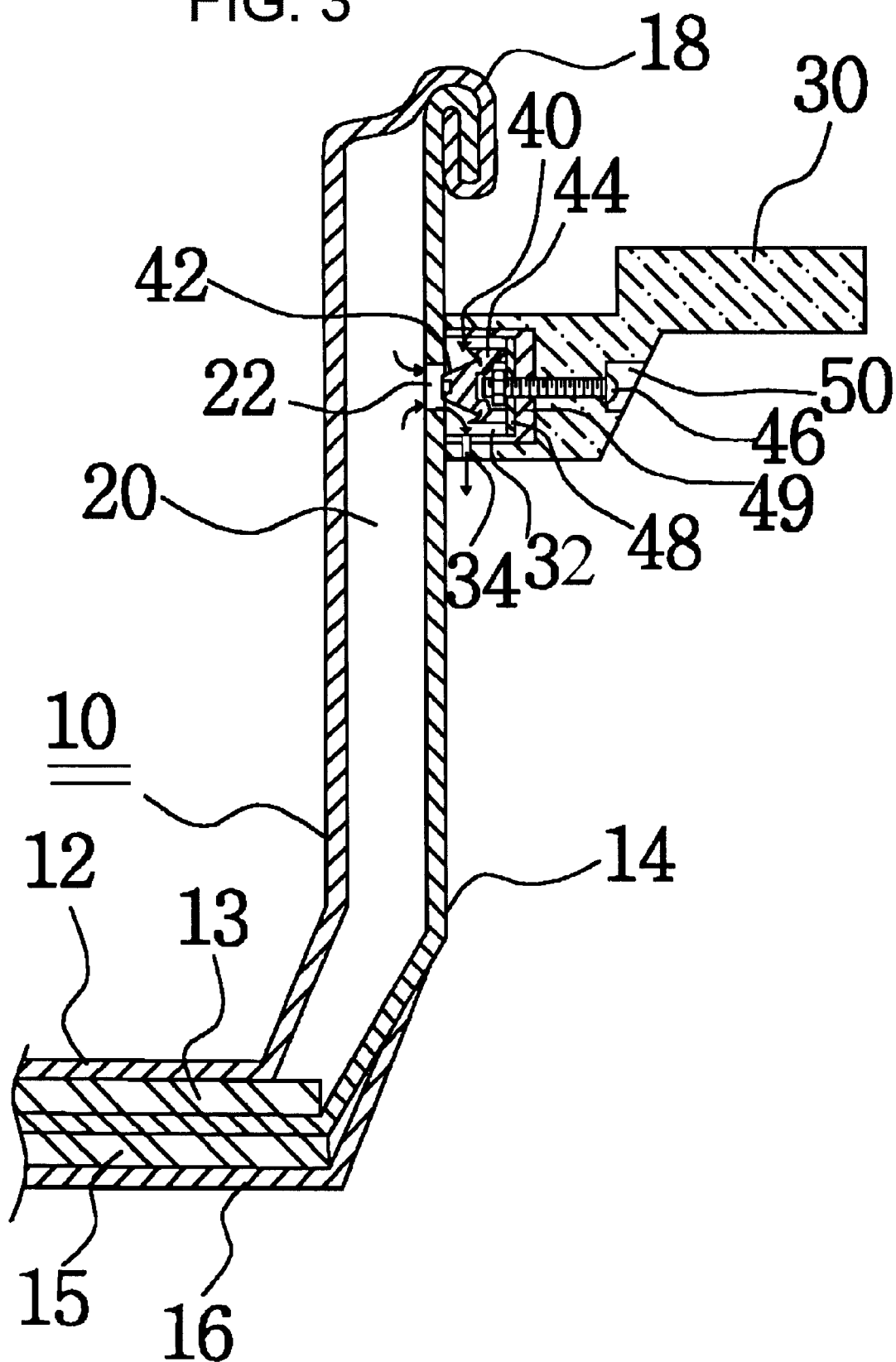
FIG. 3 illustrates a cross-sectional view of a double-layered cooking vessel according to the preferred embodiment of the present invention, in which a valve located within a handle is opened.

FIG. 2 illustrates a cross-sectional view of a double-layered cooking vessel 10 according to a preferred embodiment of the present invention, in which a valve 40 located within a handle 30 is closed, thus sealing airtight the exhaust port 22. FIG. 3 illustrates a cross-sectional view of a double-layered cooking vessel 10 according to the preferred embodiment, in which the valve 40 located with the handle 30 is open, thus enabling vaporized steam trapped within an air pocket 20 to be discharged. In FIGS. 2 and 3, a handle 30 is preferably installed on the outer shell 14 of a double-layered cooking vessel 10. Similar to the conventional double-layered cooking vessel illustrated in FIG. 1 and described above, the double-layered cooking vessel 10 also includes an inner shell 12 and an air pocket 20 formed between the outer and inner shells 14 and 12. However, the present invention, unlike conventional art, includes exhaust means featuring an exhaust port 22 formed on the outer shell 14, thereby providing a conduit for discharging vaporized high pressure gas trapped within the air pocket 20.

The exhaust means also includes a housing 49, of which one side is open and attached to the outer shell 14. Within the housing is a predetermined space 32, a valve 40 to exhaust the high pressure gas in the air pocket 20, and a fixing part 48 attached to an inner wall of the housing 49 so as to support the valve 40. The fixing part 48 may include a washer based nut having a step-like circumference, in which the washer part has a diameter that is larger than the nut part, so that the washer part supports the valve 40; A coupling part 46, such as a bolt and nut shown in FIGS. 2 and 3, affixes the handle 30 and the fixing part 48 to the housing 49. Preferably, the coupling part 46 is situated within an exposure-prevention recess 50 in the handle 30. In addition, the housing 49 and handle 30 are securely attached to the outer shell 14 by means known to one of ordinary skill in the art, such as welding or chemical adhesive. The exhaust port 22, the valve 40, and fixing part 48 are arranged in a linear fashion. Finally, an outlet hole 34 is formed in the handle 30 and housing 49 by perforation so as to allow the exhaust of vapor steam or high pressure gas from the space 32. Preferably, the outlet hole 34 is located in an area of the handle 30 free from the area of placement of a user's hand when the user grabs the handle 30 in order to avoid injury from escaping steam or gas.

Similar to conventional art, the double-layered cooking vessel 10 includes a roll-joint 18 where the edges of the outer and inner shells 14 and 12 are secured together so as to provide the air pocket 20 between the outer and inner shells 14 and 12. The bottom of the double-layered cooking vessel 10 is constructed with the inner shell 12, the outer shell 14, and a reinforcement plate 16. A first heat conduction plate 13 is installed between the inner and outer shells 12 and 14, and a second heat conduction plate 15 is installed between the outer shell 14 and reinforcement plate 16.

During submersion in water, such as when being cleaned, or when placed in areas of high humidity, water and/or moisture may flow or collect within the air pocket 20 through the roll-joint 18 or by an external force. After heating the double-layered cooking vessel 10, the liquid within the air pocket 20 is transformed into a vaporized state, i.e. steam. Consequently, the volume of the liquid or moisture, now in a vapor or gaseous state, is increased. The exhaust means including the exhaust port 22, the valve 40, and outlet hole 34 provide for decreasing the volume by discharging the steam, thereby relieving stresses on the inner and outer shells 12 and 14.

Figure 4:
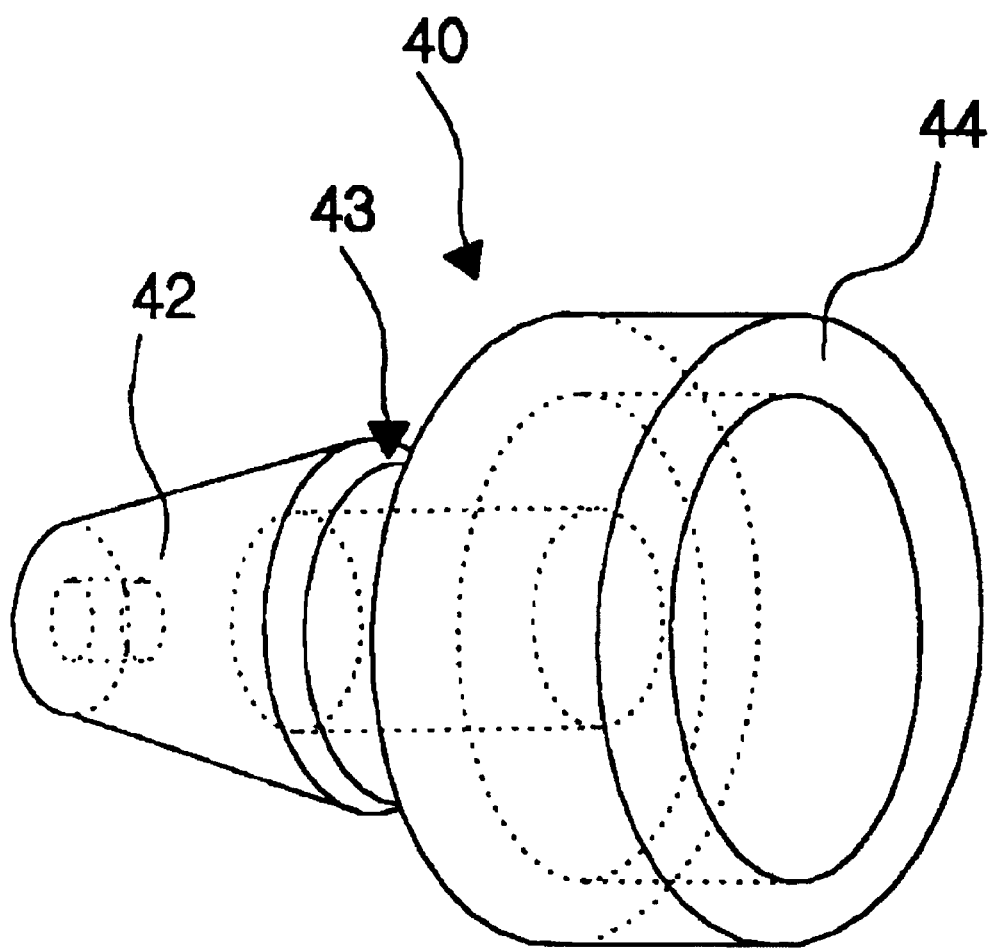
FIG. 4 illustrates a rear perspective view of a valve.

The valve 40 is normally in a closed position where the exhaust port 22 is sealed, as shown in FIG. 2. The exhaust port 22 is opened when steam pressure, which is generated from heating the moisture within the air pocket 20, compresses the valve 40 so as to shift the valve 40 away from the exhaust port, as shown in FIG. 3. Referring to FIG. 4, the valve 40, in preferred embodiments, is made of an elastic or compressible material and includes a head 42 having a conical figure so as to open/close the exhaust port 22 and a support frame 44 extending from the head 42. The shape of the head 42 may further include a spherical shape and the like. The diameter of the head 42 of the valve 40 is large enough to effectively seal the exhaust port 22. A recess is formed in the head 42 on the side nearest to the exhaust port 22 so as to receive a large force (pressure) generated from concentrating the pressure of the steam within the air pocket 20 on to the smaller square area of the recess instead of the whole side of the head 42 nearest to the exhaust port.

The head 42 extends from a support frame 44, which has a hollow cylindrical figure, by a neck 43, which is securely attached to the head 42 and the support frame. Preferably, the diameter of the neck 43 is smaller than the diameter of the support frame 44, thus facilitating the compressibility of the valve 40. Also, this difference in diameter facilitates further discharge of steam through the support frame 44 as well. At low temperatures or when there is insufficient steam pressure generated within the air pocket 20, the head 42 effectively seals the exhaust port 22 to prevent unnecessary heat loss. When sufficient steam is generated, the resulting pressure forces back the head 42 away from the exhaust port 22. The head 42, neck 43 and support frame 44 compress, clearing the exhaust port 22 and thus allowing steam to discharge into the space 32 and to the outside environment through the outlet hole 34.

The valve 40 is preferably made with a silicon based material because of silicon's high-temperature resistance qualities. Alternatively, the support frame 44 of the valve 40 may be formed of a metal or other less malleable material so as to be coupled with the fixing part 48 through a spring (not shown). A minimum pressure, preferably between 0.5 and 0.6 $Kgf/cm^2$, is set to cause movement of the head 42 of the valve 40 away from the exhaust port 22, thereby enabling the prevention of the air pocket 20 from being distorted.

Accordingly, the present invention enables to prevent the distortion or explosion of the double-layered cooking vessel due to the high pressure created by the generation of steam within the air pocket by releasing the steam through an exhaust port. Moreover, the present invention enables to provide a simpler design and construction of an improved double-layered cooking vessel by facilitating the installation of a pressure release valve.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A double-layered cooking vessel having an air pocket between inner and outer shells, the vessel comprising:
    an exhaust port on the outer shell providing an outlet for the air pocket;
    a handle mounted over the exhaust port on the exterior of the outer shell;
    a housing mounted within the handle and coaxial to the exhaust port, wherein the housing has an open side adjacent to the exhaust port, an inner wall distal to the exhaust port, and a fixing part attached to the inner wall;
    a valve mounted within the housing that is coaxial to the exhaust port and supported by the fixing part; and
    an outlet hole perforating the handle and the housing, wherein the valve comprises
        a plug head having a proximal and distal ends, wherein the plug head is arranged and travels coaxial to the exhaust port and the proximal end of the plug head engages the exhaust port;
        a support frame coaxial to the exhaust port having first and second ends and has a shape of a hollow cylinder; and
        a neck piece having first and second ends and has a diameter smaller than a diameter of the support frame and a diameter of the plug head wherein the first end of the neck piece is secured to the distal end of the plug head and the neck piece is coaxial to the exhaust port,
    and the second end of the neck piece is secured to the first end of the support frame.

2. The vessel of claim 1, wherein a coupling part affixes the handle and fixing part to the housing after the handle is coupled with the housing.

3. The vessel of claim 1, wherein the fixing part includes a washer based nut having a step-like circumference, in which the washer part has a diameter that is larger than the nut part, so that the washer part supports the valve.

4. The vessel of claim 1, wherein the plug head is has a conical figure so as to open/close the exhaust hole wherein the central part of the proximal end of the plug head is recessed.

5. The vessel of claim 1, wherein the valve further comprises silicon-based material.

6. The vessel of claim 1, wherein a minimum pressure of between 0.5 and 0.6 Kgf/cm$^2$ is required to compress the valve.

7. A double-layered cooking vessel having an air pocket between inner and outer shells, the vessel comprising:
    an exhaust port on the outer shell providing an outlet for the air pocket;
    a housing mounted over and coaxial to the exhaust port on the exterior of the outer shell, wherein the housing has an open side adjacent to the exhaust port, an inner wall distal to the exhaust port, and a fixing part attached to the inner wall;
    a valve mounted within the housing that is coaxial to the exhaust port and supported by the fixing part; and
    an outlet hole perforating the housing, wherein the valve comprises
        a plug head having a proximal and distal ends, wherein the plug head is arranged and travels coaxial to the exhaust port and the proximal end of the plug head engages the exhaust port;
        a support frame coaxial to the exhaust port having first and second ends and has a shape of a hollow cylinder; and
        a neck piece having first and second ends and has a diameter smaller than a diameter of the support frame and a diameter of the plug head wherein the first end of the neck piece is secured to the distal end of the plug head and the neck piece is coaxial to the exhaust port,
    and the second end of the neck piece is secured to the first end of the support frame.

8. The vessel of claim 7, wherein the housing is disposed within a handle secured to the outer shell of the vessel.

9. The vessel of claim 8, wherein a coupling part affixes the handle and fixing part to the housing after the handle is coupled with the housing.

10. The vessel of claim 7, wherein the fixing part includes a washer based nut having a step-like circumference, in which the washer part has a diameter that is larger than the nut part, so that the washer part supports the valve.

11. The vessel of claim 1, wherein the plug head is has a conical figure so as to open/close the exhaust hole wherein the central part of the proximal end of the plug head is recessed.

12. The vessel of claim 1, wherein the valve further comprises silicon-based material.

13. The vessel of claim 1, wherein a minimum pressure of between 0.5 and 0.6 Kgf/cm$^2$ is required to compress the valve.

* * * * *